April 27, 1937. C. F. LAUTZ 2,078,255
HYDRAULIC SHOCK ABSORBER
Filed Jan. 4, 1934
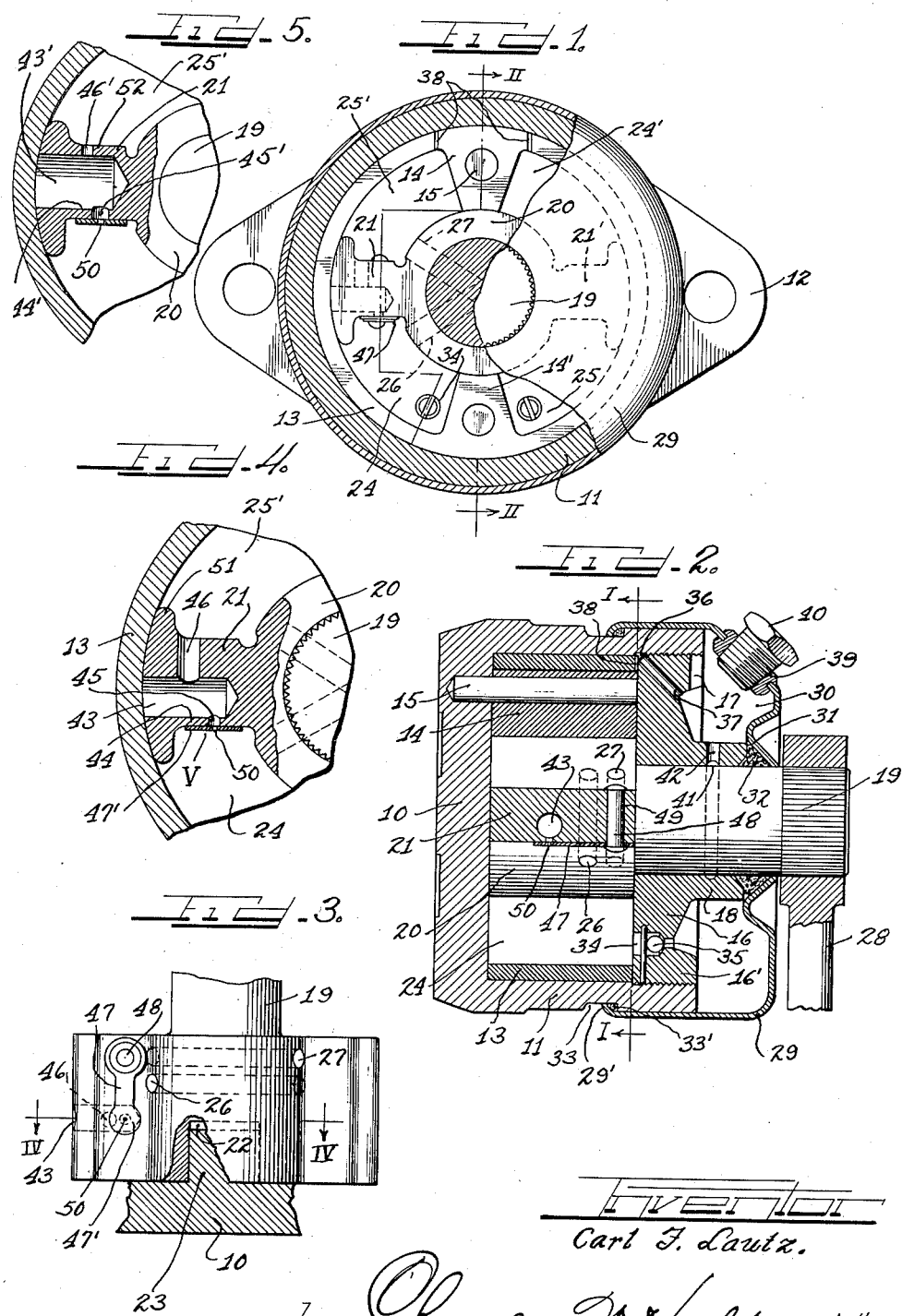
Inventor
Carl F. Lautz.

Patented Apr. 27, 1937

2,078,255

UNITED STATES PATENT OFFICE 2,078,255

HYDRAULIC SHOCK ABSORBER

Carl F. Lautz, Buffalo, N. Y., assignor to Houde Engineering Corporation, Buffalo, N. Y., a corporation of New York Application January 4, 1934, Serial No. 705,193

18 Claims. (Cl. 188—89)

My invention relates to hydraulic shock absorbers for automotive vehicles and incorporates several improved features of construction, arrangement and operation.

An important object of the invention is to provide an improved arrangement for directioning and controlling the flow of the hydraulic fluid, after such fluid has been forced through a small metering orifice, so that the velocity of flow is gradually dissipated and the flow will be noiseless.

A further object of the invention is to provide a roundabout fluid bypassage pass through the piston structure and controlling valve means comprising a reed valve with a metering orifice therethrough communicating with one end of the passage and with the arrangement such that the entire passage is visible before assembly of the piston structure in the shock absorber body so that dirt, chips or any other foreign matter which might have become lodged in the passageway or below the reed valve may be cleaned out and proper functioning of the valve and metering thus assured.

Another object of the invention is to provide simplified construction for the shock obsorber body which will facilitate more efficient assembly of the body parts, and to provide improved means for securing a reservoir forming shell to the body and for sealing against escape of fluid from the reservoir.

The above referred to and other features of my invention are incorporated in the structure disclosed on the drawing, in which drawing—

Figure 1 is a plan view of the shock absorber partly in section on plane I—I of Figure 2;

Figure 2 is a section on plane II—II of Figure 1;

Figure 3 is a side elevation of the piston structure; and

Figure 4 is an enlarged section on plane 4—4 of Figure 3, and

Figure 5 is a view similar to Figure 4, showing a modified arrangement.

The shock absorber to which I have shown my invention applied is of the so-called "Houdaille" type. The structure shown comprises a base wall 10 from which extends the cylindrical annular wall 11, the base having ears 12 by which it may be secured to a support such as the chassis of an automotive vehicle. Within the annular wall 11 is a partition frame comprising the annular wall or ring 13, from which partition lugs 14 and 14' extend from diametrically opposite points, the partition frame being seated within the wall 11 and abutting the base wall 10 and being secured against rotary movement by pins 15 extending through the lugs 14—14' and into the base wall.

At its outer end, the annular wall 11 has internal threads for receiving the closure wall 16, this wall being turned down into abutting engagement with the outer end of the partition frame so that such frame will be securely clamped between the base wall 10 and the wall 16, the wall 16 preferably having the annular relief or a peripheral part 16' which is provided with slots 17 for receiving a suitable wrench or other tool for facilitating setting of the wall.

The wall 16 has a bearing flange 18 for the shaft 19 extending from the piston structure within the partition frame, the piston structure comprising the cylindrical hub 20 and the piston vanes 21 and 21' extending radially from opposite sides of the hub, the outer surfaces of the vanes bearing against the cylindrical inner surface of the partition ring 13 while the hub 20 bears against the inner faces of the partition lugs 14 and 14'. The hub has a bearing recess 22 at its inner end for receiving the bearing and aligning lug 23 extending inwardly from the base 10 concentric with the bearing flange 18.

The piston structure and the partition lugs divide the space within the ring 13 into high pressure chambers 24 and 24' and low pressure chambers 25 and 25'. The high pressure chambers 24 and 24' are always in communication through a passageway or port 26 through the piston structure hub while the low pressure chambers 25 and 25' are always in communication through a passageway or port 27, these ports extending diametrically through the piston structure hub 20 at the solid part thereof inwardly of the bearing recess 22 so that there will be direct connection between the respective chambers and leakage of fluid from the high pressure chambers to the low pressure chambers eliminated.

At its outer end the piston hub 19 has secured thereto a lever 28 which is connected usually with the axle structure of the vehicle so that, as the vehicle travels over uneven road surfaces, the piston structure will be oscillated for displacement of the hydraulic resistance fluid in the working chambers. My improved metering and valve structure V, to which I will refer more specifically later, is provided for controlling the fluid flow resistance and therefore the shock absorbing characteristics.

Surrounding the outer end of the annular wall 11 is a sheet metal cup or cover 29 which, with the wall 16 and the bearing flange 18, defines a fluid reservoir 30. The bottom of the cup or cover has an opening for receiving the shaft 19 and is deflected inwardly to provide a conical packing engaging flange 31 for holding suitable packing material 32 intimately against the shaft and the outer undercut end of the bearing flange 18. The annular wall 11 has the circumferential channel 33 into which the edge 29' of the cup 29 is spun or deflected to rigidly secure the cover and to draw the packing flange 31 against the packing 32. A suitable gasket or packing material 33' is interposed between the deflected rim of the cup and the outer shoulder of the channel 33. This packing material may be first applied in the channel and the cup rim then deflected into the channel to compress the packing material in the channel corner so as to seal against leakage of fluid from the reservoir 30.

Replenishing fluid is conducted to the pressure chambers through passageways 34 in the wall 16, each of the lower chambers 24 and 25 being connected with the reservoir through one of these passages, and each passage is controlled by a check-valve such as a ball 35 which permits flow from the reservoir to the chambers but prevents reverse flow. Any fluid leaking out of the pressure or working chambers will find its way to an annular channel 36 which may be provided by chamfering the inner edge of the wall 16, this channel communicating at its top with the reservoir through a passageway 37 through the wall 16. Any gases or air which may collect at the tops of the upper working chambers 24' and 25' will escape to the channel 36 through small passageways 38 which passageways may be formed by cutting small grooves across the inner edge of the partition ring 13, the air or gas escaping from the channel 36 through the passage 37 to the top of the reservoir. The cup or cover 29 has a filler opening 39 through which fluid may be poured into the reservoir, this opening being provided with a closure plug 40. Any fluid leaking from the working chambers along the shaft 19 is caught in the annular groove 41 in the bearing flange 18 and conducted to the upper part of the reservoir through a passage 42.

Describing now the fluid flow valving and metering means V, the resistance path for the fluid flow is through one of the piston vanes, the drawing showing it through the vane 21, between the high and low pressure chambers 24 and 25'. A cylindrical bore or chamber 43 extends longitudinally into the vane from the outer end thereof and close to the high pressure chamber side of the vane to leave a comparatively thin wall 44 between the bore and the high pressure chamber as shown in Figs. 1 to 4. Toward the inner end of the bore an orifice 45 is drilled through the wall 44 at right angles to the bore axis, and an orifice or passageway 46 of larger diameter extends through the vane from the bore 43 to the low pressure chamber 25', the axes of the orifices being parallel but that of the orifice 46 being offset a distance outwardly from the axis of the orifice 45. The diameter of the bore 43 is considerably larger than the diameter of either of the orifices.

Extending transversely on the high pressure chamber side of the vane is a reed 47 whose end 47' forms a valve for the orifice 45. At its other end, the reed is anchored to the vane by a rivet 48 extending through the hole 49 in the vane. The valving end 47' of the reed has a discharge orifice 50 concentric with the orifice 45. This discharge or metering orifice 50 may be of the standard knife-edge type and its diameter determines the resistance to the flow of the fluid from the high pressure to the low pressure chambers when the shock absorber is in operation. When the piston structure moves in anti-clockwise direction (Figures 1 and 4), the pressure of the fluid will hold the reed pressed against the vane so that all of the fluid will flow through the small orifice 50. When the piston rotates in the opposite direction the diameter of the larger port 45 determines the resistance to the flow and the pressure of the fluid against the reed will lift the valve end of the reed away from the port 45 so that the fluid may flow freely therethrough. The diameter of the port 45 is sufficiently larger than the diameter of the orifice 50 so that, where this orifice 50 is of the standard knife-edge type, the fluid jet through the orifice 50 during the high pressure stroke of the piston structure will not touch the sides of the orifice 45 so that the jet through the orifice 50 may properly contract to cause compensation for change of viscosity resulting from change of temperature of the fluid.

When the contracted jet from the orifice 50 reaches the intermediate chamber 43 of comparatively large diameter, it has ample room for expansion and a considerable part of the fluid velocity is dissipated. The fluid cannot flow directly from the orifice 50 into the outlet passage 46 to the low pressure chamber as the axis of this outlet is offset from the axis of the orifice. The stream from the orifice 50 therefore strikes against the opposite wall of the chamber 43 and must deflect at right angles to reach the outlet 46. After dissipation of the velocity in the intermediate chamber 43 the fluid flows smoothly through the passage 46 which is of less diameter than that of the chamber 43. The gradual dissipation of the velocity of the stream from the orifice 50 in the intermediate chamber 43 and the offsetting of the outlet passage 46 from the orifice 50 eliminates any tendency to noisy flow.

The partition lug supporting ring 13 is engaged by the outer cylindrical surfaces of the vanes and forms a closure for the outer ends of the intermediate chamber 43.

It may happen that dirt, drilling chips, or other foreign matter may become lodged in the chamber 43 or in the orifices and passages connecting therewith, or under the reed valve which might interfere with the proper operation of the metering and valving structure. However, with my improved arrangement, the chamber, the orifices and passageways, and the reed valve are fully visible before the piston structure is assembled into the shock absorber body so that the openings and parts can be thoroughly inspected and cleaned before assembly, and efficient and proper operation of the shock absorber is thus assured.

During the low pressure stroke of the shock absorber, that is, when the vehicle chassis moves toward the axle, the fluid flows from the low pressure chambers through the passage 46, the intermediate chamber 43, and the orifice 45 to the high pressure chamber, the reed valve being readily lifted and affording very little resistance to such flow.

In the modified arrangement shown by Figure 5, the bore 43' which forms the intermediate chamber in the fluid passageway comes close to the low pressure side of the vane 21 to leave a thin wall 52 through which is the orifice 46' for metering and controlling the flow from the low pressure chambers to the high pressure chambers.

The passage 45' through the wall 44' would then be of larger diameter than that of the orifice 46'. The more restricted orifice 50 would then meter the flow from the high pressure chambers to the low pressure chambers while the larger orifice 46' would meter the flow from the low pressure chambers, to the high pressure chambers, with the intermediate chamber 43' between the orifices for the gradual dissipation of the velocity of the fluid stream into the chamber from the orifices. The orifices would be relatively laterally offset to provide the roundabout or offset flow path for the fluid.

The various features of my invention result in a compact, economically manufactured and easily assembled and efficient shock absorber. I do not desire to be limited to the exact construction, arrangement and operation shown and described as changes and modifications are possible which would still come within the scope of the invention defined by the appended claims.

I claim as my invention:

1. In a hydraulic shock absorber, the combination of a housing forming a chamber for hydraulic fluid, a piston structure operable within said chamber to displace the fluid therein, a passageway for the flow of hydraulic fluid from one side of the piston structure to the other, said passageway comprising an intermediate expansion chamber, a port leading from said chamber to one side of the piston and a smaller port leading from said expansion chamber to the other side of said piston, a reed valve overlying said smaller port and having a metering orifice registering with said smaller port.

2. In a hydraulic shock absorber, a housing providing a working chamber for containing hydraulic fluid, a piston operable in said chamber to displace the fluid therein, a bypassageway for the flow of fluid from one side of the piston to the other, said bypassageway comprising an intermediate expansion chamber, a port connecting said expansion chamber with the working chamber at one side of the piston and a smaller port connecting said expansion chamber with the working chamber at the other side of the piston, the axes of said ports being offset, and a reed valve overlying said smaller port and having a metering orifice in registration therewith.

3. In a hydraulic shock absorber, the combination of a housing forming a cylindrical working chamber for hydraulic fluid, a rotatable piston structure comprising a vane reciprocable in said working chamber to displace fluid therein, there being a bypassage through said vane for the flow of fluid from one side of the vane to the other as the piston structure oscillates, said bypassageway comprising an intermediate expansion chamber extending longitudinally of vane, a port extending from said expansion chamber to one side of the vane and a smaller port extending from said expansion chamber to the other side of the vane, the axes of said ports being offset longitudinally of the vane, a reed valve secured on said vane and overlying said smaller port and having a metering orifice registering therewith.

4. In a hydraulic shock absorber, the combination of a housing defining a space for containing hydraulic fluid, a piston movable in said space and dividing said space into a high pressure side and a low pressure side, a chamber in said piston, there being a passageway connecting said chamber with the low pressure side of said space, and an orifice connecting said chamber with the high pressure side of said space, said orifice metering the flow from the low pressure side to the high pressure side of said space, a reed valve on the high pressure side of said piston overlying said orifice to close said orifice against the flow of fluid from the high pressure side to the low pressure side of said space but flexing under pressure for flow from the low pressure side to the high pressure side of said space, and a restricted metering orifice in said valve concentric with said first-mentioned orifice for restricting and metering the flow from the high pressure side to the low pressure side of said space.

5. In a hydraulic shock absorber, a cylindrical wall forming space for containing resistance fluid, a piston structure comprising a hub concentric with said wall and a vane extending from said hub to the inner side of said cylindrical wall, said piston dividing said space into a high pressure chamber and a low pressure chamber, said vane having a bore extending radially therein from its outer end and said bore at its outer end being closed by said cylindrical wall, there being a passageway connecting said bore with the low pressure chamber, the wall between said bore and the high pressure chamber being thin and provided with a metering orifice for the flow of fluid from the low pressure chamber through said passageway and said bore and orifice, a reed valve on said vane at the high pressure chamber side thereof, said valve overlying said orifice and having a restricted orifice therethrough concentric with said first-mentioned orifice, said valve being moved by the pressure to expose said first-mentioned orifice for flow from the low pressure chamber to the high pressure chamber but being moved by the pressure to close said first-mentioned orifice and expose only said restricted orifice for flow of fluid from the high pressure chamber to the low pressure chamber.

6. In a hydraulic shock absorber, a cylindrical wall forming space for containing resistance fluid, a piston structure comprising a hub concentric with said wall and a vane extending from said hub to the inner side of said cylindrical wall, said piston dividing said space into a high pressure chamber and a low pressure chamber, said vane having a bore extending radially therein from its outer end and said bore at its outer end being closed by said cylindrical wall, there being a passageway connecting said bore with the low pressure chamber, the wall between said bore and the high pressure chamber being thin and provided with a metering orifice for the flow of fluid from the low pressure chamber through said passageway and said bore and orifice, a reed valve on said vane at the high pressure chamber side thereof, said valve overlying said orifice and having a restricted orifice therethrough concentric with said first-mentioned orifice, said valve being moved by the pressure to expose said first-mentioned orifice for flow from the low pressure chamber to the high pressure chamber but being moved by the pressure to close said first-mentioned orifice and expose only said restricted orifice for flow of fluid from the high pressure chamber to the low pressure chamber, the axis of said passageway being parallel with the axis of said orifices but being offset laterally therefrom.

7. In a hydraulic shock absorber, the combination of a cylindrical wall enclosing a space for hydraulic fluid, a piston structure comprising a hub concentric with said cylindrical wall and a vane extending radially from said hub to said wall, said piston structure dividing said space into a high pressure chamber and a low pressure chamber, said vane having a bore extending longitudinally therein from the outer end thereof and close to the high pressure side of the vane to leave a thin wall, a metering orifice through said thin wall connecting said bore with the high pressure chamber, a passageway connecting said bore with the low pressure chamber, a reed valve on said vane on the high pressure side thereof having a restricted orifice in alignment with said first-mentioned orifice, said reed being deflected by the pressure of fluid flowing from the low pressure chamber to the high pressure chamber whereby said first-mentioned orifice is exposed to meter such flow, said reed being held to close said first-mentioned orifice by the pressure of the fluid from the high pressure chamber to the low pressure chamber whereby said restricted orifice will meter such flow.

8. In a hydraulic shock absorber, the combination of a cylindrical wall enclosing a space for hydraulic fluid, a piston structure comprising a hub concentric with said cylindrical wall and a vane extending radially from said hub to said wall, said piston structure dividing said space into a high pressure chamber and a low-pressure chamber, said vane having a bore extending longitudinally therein from the outer end thereof and close to the high pressure side of the vane to leave a thin wall, a metering orifice through said thin wall connecting said bore with the high pressure chamber, a passageway connecting said bore with the low pressure chamber, a reed valve on said vane on the high pressure side thereof having a restricted orifice in alignment with said first-mentioned orifice, said reed being deflected by the pressure of fluid flowing from the low pressure chamber to the high pressure chamber whereby said first-mentioned orifice is exposed to meter such flow, said reed being held to close said first-mentioned orifice by the pressure of the fluid from the high pressure chamber to the low pressure chamber whereby said restricted orifice will meter such flow, the axis of said passageway being parallel with the axis of said orifices but being offset laterally therefrom.

9. In a hydraulic shock absorber the combination of a housing forming a chamber for hydraulic fluid, a piston structure operable within said chamber to displace the fluid therein, a passageway for the flow of hydraulic fluid from one side of the piston structure to the other, said passageway comprising an intermediate expansion chamber, a port leading from said chamber to one side of said piston and another port leading from said expansion chamber to the other side of said piston, and a reed valve overlying one of said ports and having a metering orifice in registration therewith.

10. In a hydraulic shock absorber, a housing providing a working chamber for containing hydraulic fluid, a piston operable in said chamber to displace the fluid therein, and a bypassageway for the flow of fluid from one side of the piston to the other, said bypassageway comprising an intermediate expansion chamber, a port connecting said expansion chamber with the working chamber at one side of said piston and another port connecting said expansion chamber with the working chamber at the other side of said piston, the axes of said ports being offset, and a reed valve overlying one of said ports and having a restricted metering orifice in registration therewith.

11. In a hydraulic shock absorber, the combination with a housing forming a cylindrical working chamber for hydraulic fluid, a rotatable piston structure comprising a vane reciprocable in said working chamber to displace fluid therein, there being a bypassage through said vane for the flow of fluid from one side of the vane to the other as the piston structure oscillates, said bypassageway comprising an intermediate expansion chamber extending longitudinally of said vane, an orifice in said vane extending from said expansion chamber to one side of the vane and a port in said vane extending from said expansion chamber to the other side of said vane, a reed valve secured on said vane and overlying said port and having a metering orifice registering therewith, the axes of said orifices being offset longitudinally of the vane.

12. In a hydraulic shock absorber, the combination of a cylindrical wall enclosing a space for hydraulic fluid, a piston structure comprising a hub concentric with said cylindrical wall and a vane extending radially from said hub to said wall, said piston structure dividing said space into a high pressure chamber and a low pressure chamber, said vane having a bore extending longitudinally therein from the outer end thereof and of a diameter to leave thin walls between said bore and said high and low pressure chambers, a metering orifice through one of said walls connecting said bore with the low pressure chamber, a port in the other wall connecting said bore with the high pressure chamber, a reed valve on the high pressure chamber side of said vane having a restricted metering orifice in alignment with said port, said reed being deflected by the pressure of fluid flowing from the low pressure chamber to the high pressure chamber whereby said port is exposed for flow of fluid therethrough to the high pressure chamber, said reed being held to close said port by the pressure of the fluid from the high pressure chamber to the low pressure chamber whereby said restricted orifice will meter said flow, the axes of said orifices being parallel but being offset radially relatively.

13. In a hydraulic shock absorber, the combination of a housing forming a chamber for hydraulic fluid, a piston structure operable in said housing to displace the fluid, a restricted passage for metering the flow of the displaced fluid, a reed valve controlling said passage and having a sharp edge orifice in registration with said passage, said orifice being more restricted than said passage, said valve arranged to yield to open said passage for flow therethrough in one direction and to close said passage except for said orifice against flow in the opposite direction.

14. In a hydraulic shock absorber, the combination of a housing defining a space for containing hydraulic fluid, a piston operable in said space and dividing said space into a high pressure side and a low pressure side, a passage for the flow of fluid displaced by said piston, a wall interposed in said passage and having a restricted orifice therethrough for metering the flow from the low pressure side to the high pressure side, a reed valve mounted on said wall and having a sharp edge orifice for registration with but more restricted than the first mentioned orifice for metering the flow from the high pressure side to the low pressure side, said valve arranged to yield to expose said first mentioned orifice for the low pressure flow and to expose only said other more restricted orifice for the high pressure flow.

15. In a hydraulic shock absorber, the combination of a housing defining a space for containing hydraulic fluid, a piston movable in said space and dividing said space into a high pressure side and a low pressure side, a passageway for the flow of fluid displaced by said piston, a thin wall interposed in said passage having an orifice for metering the flow from the low pressure side to the high pressure side, a reed valve on said wall overlying said orifice and having a more restricted orifice in registration therewith for metering the flow from the high pressure side to the low pressure side, said valve being arranged to be flexed by the low pressure flow to expose said wall orifice and to close said wall orifice during high pressure flow and to expose only the valve orifice to the high pressure flow.

16. In a shock absorber the combination of a fluid-containing casing having a passage therein, means for causing a flow of fluid through said passage alternately in opposite directions, means restricting a portion of said passage to a permanently open orifice of relatively small area for limiting the flow in one direction to produce a shock absorbing action, and a member having a flap portion in cooperating engagement with the last mentioned means for reducing the area of the orifice thereby further restricting the flow in the opposite direction to produce an increased shock absorbing action.

17. In a shock absorber the combination of a fluid-containing casing having a passage therein, means for causing a flow of fluid through said passage alternately in opposite directions, means restricting a portion of said passage to an opening of relatively small area for restricting the flow in one direction, and a member having a flap portion adapted to be seated against the restricting means, said flap portion having an opening therein of smaller area than the first mentioned opening for further restricting the flow in the opposite direction.

18. In a fluid flow shock absorber the combination of a casing having a fluid-containing cylinder therein, abutments in said cylinder, a piston operable in said cylinder, said piston and abutments cooperating to divide the cylinder into a plurality of pairs of chambers, means providing a passage connecting the chambers of each of said pairs, and means controlling the transfer of fluid from one pair of chambers to the other, said means comprising a part having a restricted opening therein and a relatively thin flexible part movable relative to the first mentioned part and adapted to be seated thereagainst, said flexible part having an opening therethrough of smaller area than said restricted opening and which communicates with said restricted opening when the flexible part is seated against said first mentioned part.

CARL F. LAUTZ.